UNITED STATES PATENT OFFICE.

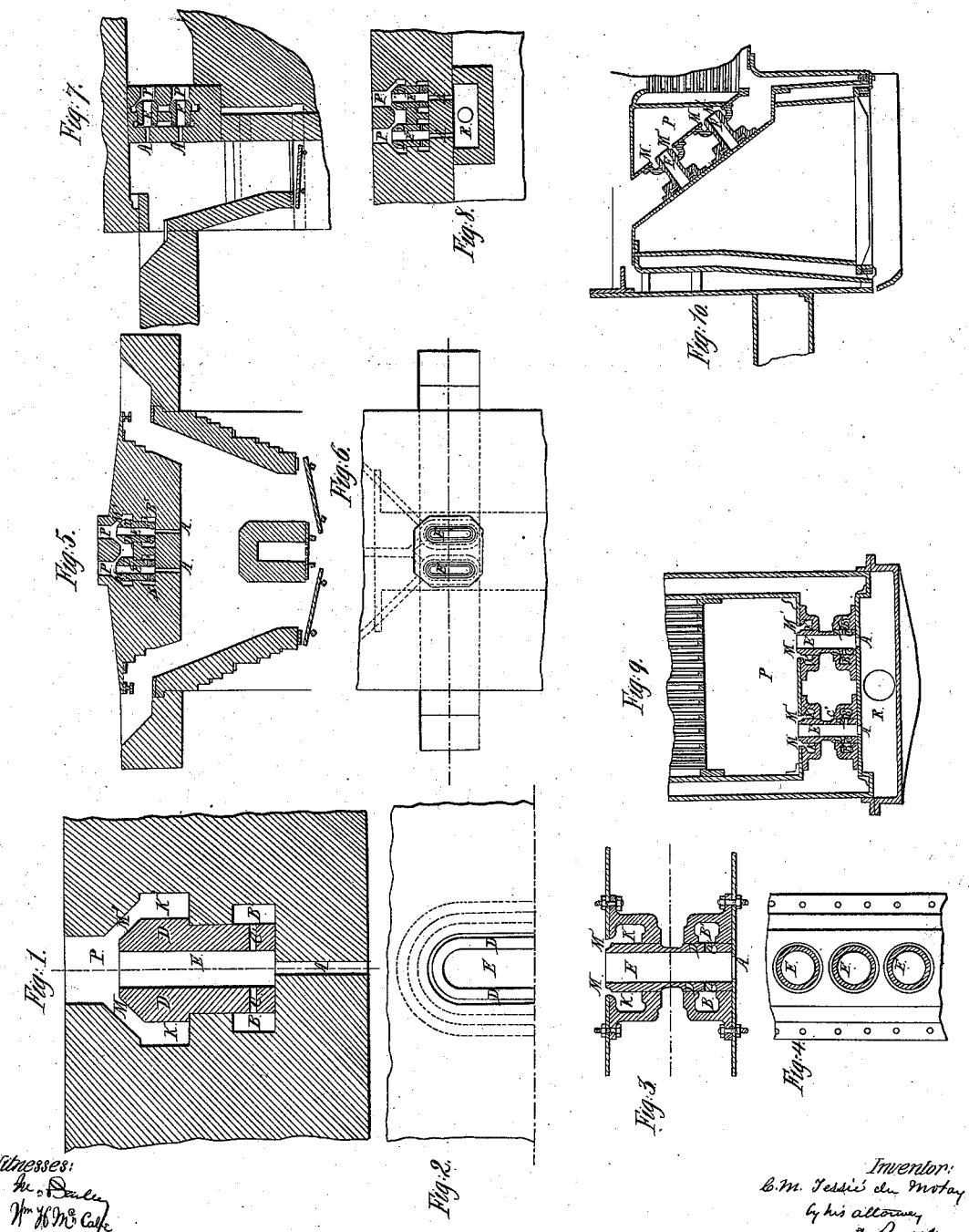

C. M. TESSIÉ DU MOTAY, OF PARIS, FRANCE, ASSIGNOR TO EDWARD STERN, OF NEW YORK.

IMPROVEMENT IN APPARATUS FOR BURNING GASES FOR METALLURGIC AND OTHER PURPOSES.

Specification forming part of Letters Patent No. 87,476, dated March 2, 1869.

To all whom it may concern:

Be it known that I, CYPRIEN MARIE TESSIÉ DU MOTAY, of Paris, in the Empire of France, have invented certain new and useful Improvements in Apparatus for Completely Burning Hydrogen, Carbon, and other Gases; and I hereby declare the following to be a full, clear, and exact description of the same, reference being had to the accompanying drawings.

The object I have in view is to produce a new apparatus for completely burning hydrogen gases, carbonic oxide, proto-carbureted hydrogen, bicarbureted hydrogen, and other carburets of hydrogen, whether mixed or not with nitrogen, and generated in gas-machines, which may or may not form part of the apparatus.

The combination of the parts of my apparatus, as well as the manner in which it may be adapted to various gas-generators, will be readily understood by reference to the drawings hereto annexed.

The burning apparatus may be made of any refractory body, as shown in vertical section, Figure 1, and in plan, Fig. 2, or of metal, as represented in vertical section, Fig. 3, and in plan, Fig. 4. In either case the apparatus is constructed in the following manner:

A is a conduit, through which are introduced the hydrogen gases, carbonic oxide, carbureted hydrogens of different kinds, produced either by a gas-generating apparatus, as shown in Figs. 5, 6, 7, and 8, to which is united my burning apparatus, which directly consumes by the passage of the air the fuel, of whatsoever nature, transformed by means of distillation or of decomposition into carbonic oxide, nitrogen, hydrogen, and carbureted hydrogens of different kinds, or by the gas-generators for which an application in my name for Letters Patent, of even date herewith, is now pending in the United States Patent Office, and in connection with which is employed the apparatus represented in Figs. 9 and 10, the said generators being capable of transforming the fuel by alternate action into a mixture of carbonic oxide of pure hydrogen and of carbureted hydrogens without the admixture of nitrogen.

B B' are conduits for the cold air. C C' are apertures of suitable shape, spread as much as possible on the periphery of the burner D. D is the body of the burner, consisting of a tube of cylindrical or other suitable shape, and formed of a suitable refractory material, (see Figs. 1 and 2,) or of a metallic substance, as shown in Figs. 3 and 4; in the latter case the metallic body should be provided with a water-jacket, and either wrought or cast iron, bronze, or other metal may be employed for the purpose. E is the chamber in which takes place the mixture of the combustible gases with the cold air passing from the holes C C'. K K' are conduits for air, heated either in the furnace or by any suitable air-heating apparatus. M M' is a conduit surrounding either the whole or a part of the periphery of the burner D; and it is through this conduit that the heated air passes from the flues K K', and mixes in the chamber P with the combustible gases already supplied with cold air, and causes them to be completely consumed. From this chamber the flame and gases are conducted into the apparatuses to be heated.

Figs. 5, 6, 7, and 8 represent different applications of the burning apparatus to a refractory body; and Figs. 9 and 10 represent applications of the same apparatus to a metallic body. In Fig 5 the burning apparatus is applied vertically to a gas-generator forming a part of the furnace. In Fig. 7 the apparatus is arranged horizontally with respect to the generator. Fig. 9 represents the application of my metallic burner to a heating apparatus in the case when the gas-generator is removed or distant from the apparatus. Fig. 10 represents the application of my metallic burner to the boiler-furnace of a movable engine, locomotive, or marine engine, or of any apparatus the furnace of which is united with the burner. Letter R in Figs. 8 and 9 indicates the chamber or the flue which receives the combustible gases.

In conclusion, I would observe that either cold or hot air, as may be desired, can be introduced through the flues K K', and that chambers of any number and form may be arranged around the burner D, in which the gases and air can be mixed. The burner D can also be placed, either vertically or horizontally, at any desired inclination; and, lastly, the hot or cold air employed to effect the combustion of the gases may be enriched by a suitable proportion of hydrogen, or may be even completely replaced by this gas.

Having now described my invention, and the manner in which the same is or may be carried into effect, what I claim, and desire to secure by Letters Patent, is—

The apparatus for burning hydrogen, carbon, and other gases, constructed and applied either directly or indirectly to the apparatus which generates or supplies the gases, substantially in the manner herein shown and described.

In testimony whereof I have signed my name to this specification before two subscribing witnesses.

C. M. TESSIÉ DU MOTAY.

Witnesses:
   C. LAFOUR,
   F. OLCOTT.